(12) United States Patent
Wu et al.

(10) Patent No.: US 7,438,333 B2
(45) Date of Patent: Oct. 21, 2008

(54) MAGNETIC LATCH ASSEMBLY

(75) Inventors: Cheng-Yu Wu, Taipei (TW); Yun-Tang Lin, Taipei (TW)

(73) Assignee: Inventec Corporation, Taipei (TW)

( * ) Notice: Subject to any disclaimer, the term of this patent is extended or adjusted under 35 U.S.C. 154(b) by 134 days.

(21) Appl. No.: 11/699,331

(22) Filed: Jan. 30, 2007

(65) Prior Publication Data

US 2008/0179897 A1 Jul. 31, 2008

(51) Int. Cl.
*E05C 17/56* (2006.01)
(52) U.S. Cl. .................................. 292/251.5; 335/285
(58) Field of Classification Search ............. 292/251.5; 335/285; 361/726, 732
See application file for complete search history.

(56) References Cited

U.S. PATENT DOCUMENTS 7,261,331 B2 *  8/2007  Lin ............................ 292/116

7,405,927 B2 *  7/2008  Lev ............................ 361/683
2002/0089190 A1 *  7/2002  Wang et al. .............. 292/251.5

* cited by examiner

*Primary Examiner*—Ramon M Barrera
(74) *Attorney, Agent, or Firm*—Rabin & Berdo, P.C.

(57) ABSTRACT

A magnetic latch assembly includes a first body, a second body, and a magnetic block and a magnetic latch. The magnetic block is movably disposed on the first body; therefore, it can be selectively moved close to or far away a first opening of the first body. The magnetic latch is disposed on the second body corresponding to a second opening of the second body. In addition, two ends of the magnetic latch form a hook portion and a tip portion, respectively. When the first body is close up against the second body and the magnetic block is moved close to the first opening, the magnetic block and the tip portion repel each other due to magnetic force so as to drive the magnetic latch rotating, so that the hook portion is moved and passing through the second opening and the first opening and hooked against the first body.

8 Claims, 4 Drawing Sheets

MAGNETIC LATCH ASSEMBLY

BACKGROUND OF THE INVENTION

1. Field of Invention

The present invention generally relates to a latch for latching two bodies, and in particular relates to a magnetic latch assembly applying magnetic principle for actuation.

2. Related Art

Along with the continuously renewing electrical devices, people request the function and quality of the products more and more. Particularly the manufacturers of notebook computers within the electronic information devices devote much research and developments in the products.

Notebook computers nowadays, besides being continuously upgraded of their operating speed, are also aimed at the weight and volume of the case to be light in weight and compact in size. On the latches of the upper and lower cases of notebook computers, they are also designed to be more convenient for consumers to use.

Currently, the latch of a notebook computer usually includes a pressing button located on outer side of the liquid crystal display. When a user depresses the button inward, a hook extruding from the case of the liquid crystal display (LCD) is released from a slot formed on the main case of the notebook computer so that the case of the LCD is released. To latch the case of LCD to the main case of the notebook computer, the user has to press the case of LCD toward the main case and to force the hook latch into the slot. The hook and the slot are latched by resilient force between the two. When opening the case of LCD, the user must use the thumb to overcome the resilient (spring) force of the latch and release the hook from the slot of the main case. Such hard pressing operation is quite unreasonable in relation to the case design that is intended to be light in weight and compact in size.

Because nowadays people treasure esthetic design of products, the appearance of notebook computer becomes one of the consumer's considerations. Therefore, how to reduce extruding portions, like the extruding hook, on the case of notebook computer is also a design issue for the manufacturers.

SUMMARY OF THE INVENTION

In view of the above problems, the object of the present invention is to provide a magnetic latch that overcomes the problem of previous protrusion coming out of bodies.

To achieve the object, the present invention provides a magnetic latch assembly. The magnetic latch assembly comprises a first body, a magnetic block, a second body and a magnetic latch. The first body has a first opening. The magnetic block is movably disposed on an inner side of the first body; therefore, it can be selectively moved close to or far away the first opening. Also, the second body can be selectively close up against the first body or far away from the first body. The second body has a second opening corresponding to the first opening. The magnetic latch is disposed on the second body corresponding to the second opening. In addition, two ends of the magnetic latch form a hook portion and a tip portion, respectively. When the first body is close up against the second body and the magnetic block is moved close to the first opening, the magnetic block and the tip portion repel each other due to magnetic force so as to drive the magnetic latch rotating, so that the hook portion is moved and passing through the second opening and the first opening and hooked against the inner side of the first body.

The present invention may achieve the following advantage: the magnetic latch and the magnetic block of the magnetic latch assembly can be accommodated on the first body and the second body when the first body and the second body are apart from each other; therefore, the magnetic latch assembly will not protrude out of the first body and the second body, so as to reduce the problems coming from the protruded structure.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will become more fully understood from the detailed description given hereinbelow. However, this description is for purposes of illustration only, and thus is not limitative of the invention, wherein.

DETAILED DESCRIPTION OF THE INVENTION

The purpose, construction, features, and functions of the invention can be appreciated and understood more thoroughly through the following detailed description with reference to the attached drawings.

Figure 1:
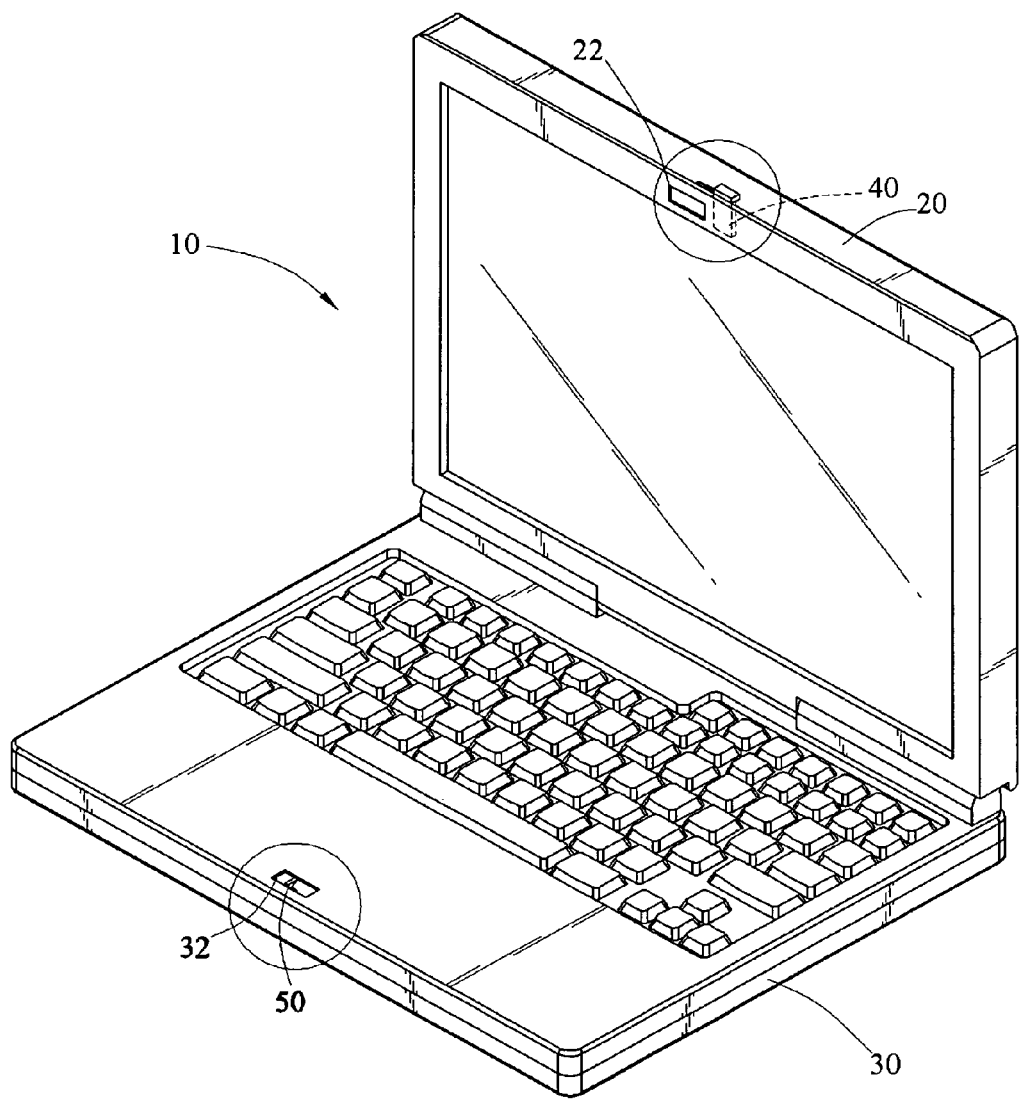
FIG. 1 is a perspective view of a magnetic latch assembly in an embodiment of the present invention.

As shown in FIG. 1, it is a perspective view of one embodiment of a magnetic latch assembly. The magnetic latch assembly of the present invention comprises a first body 20, a second body 30, a magnetic block 40 and a magnetic latch 50. One side of the first body 20 is pivotly connected to one side of the second body, so that the first body can be rotated by an angle corresponding to the second body. Therefore, the first body can be selectively moved close to or away from the first body. The first body 20 and the second body 30 can be combined into a lid-lift type electrical device 10, such as a notebook computer, a mobile phone, a personal digital assistant (PDA), or a handheld computer. In one embodiment, the electrical device 10 functions as a notebook computer. In addition, the first body 20 is not limited to be pivotly connected with the second body 30. The first body 20 may be separated from the second body 30 and only connected with it by magnetic latch assembly.

The first body 20 has a first opening 22 and a sliding slot 24. The first opening 22 is located on one side of the first body 20 facing toward the second body 30 and the sliding slot 24 is located on a place of the surface of the first body 20 adjacent to the first opening 22. In addition, the second body 30 has a second opening 32 located on the one side of the second body 30 facing toward the first body 20. The second opening 32 is corresponding to the first opening 22, so that both the first opening 22 and the second opening 32 can be connected each other when the first body 20 is close up against the second body 30.

Figure 2A:
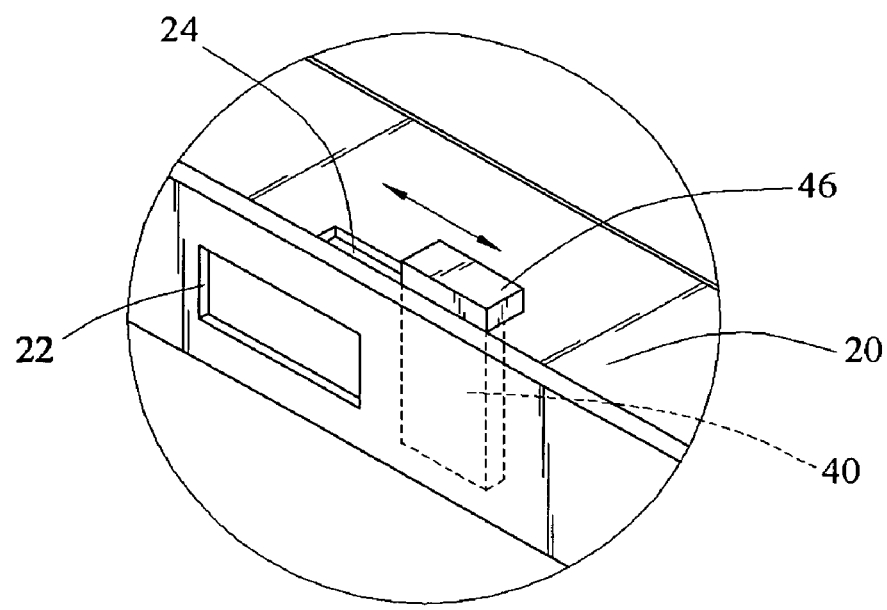
FIG. 2A is an enlarged view of a portion of the first body.
Figure 3:
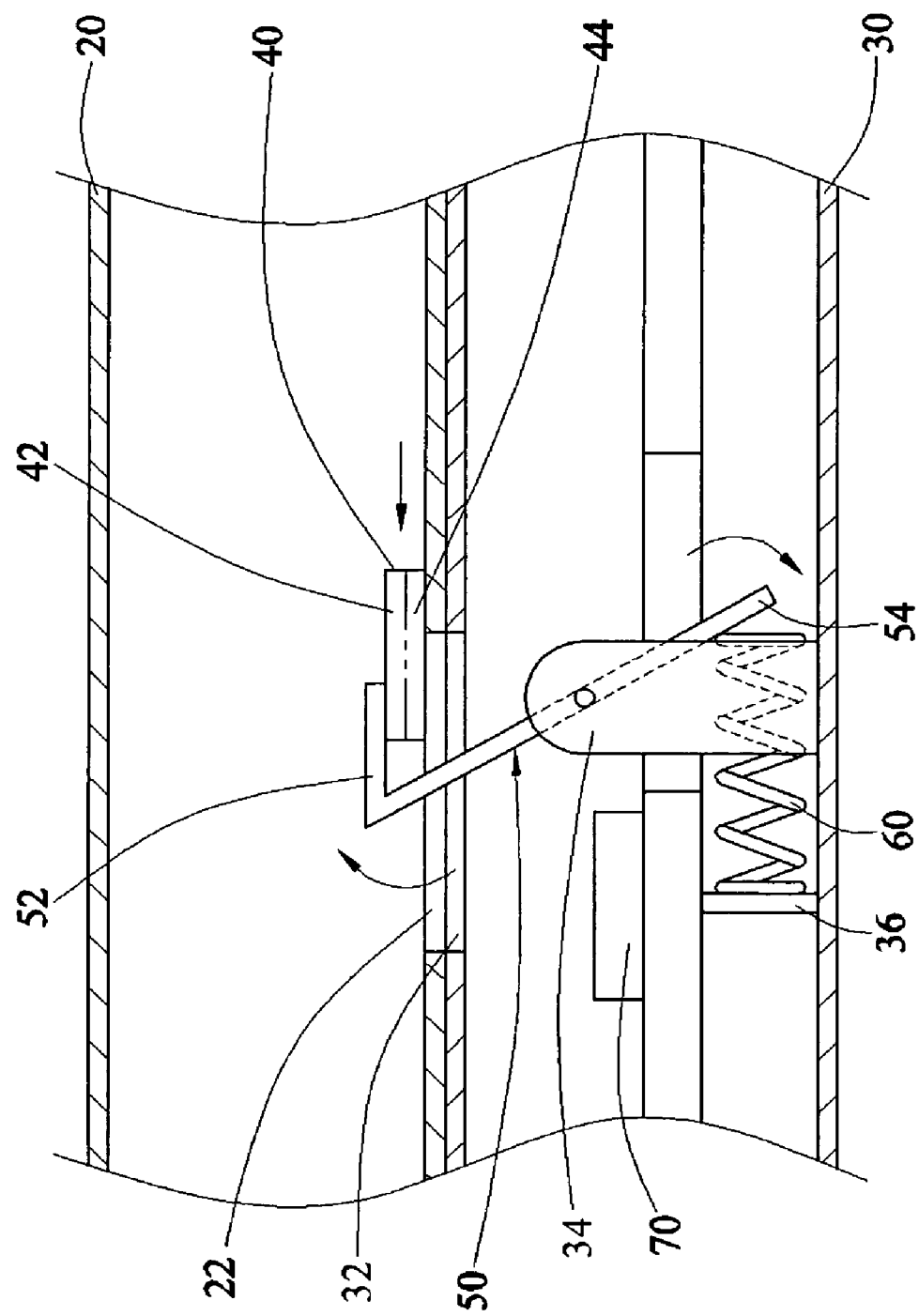
FIG. 3 is a functional view of a magnetic latch assembly before latching.
Figure 4:
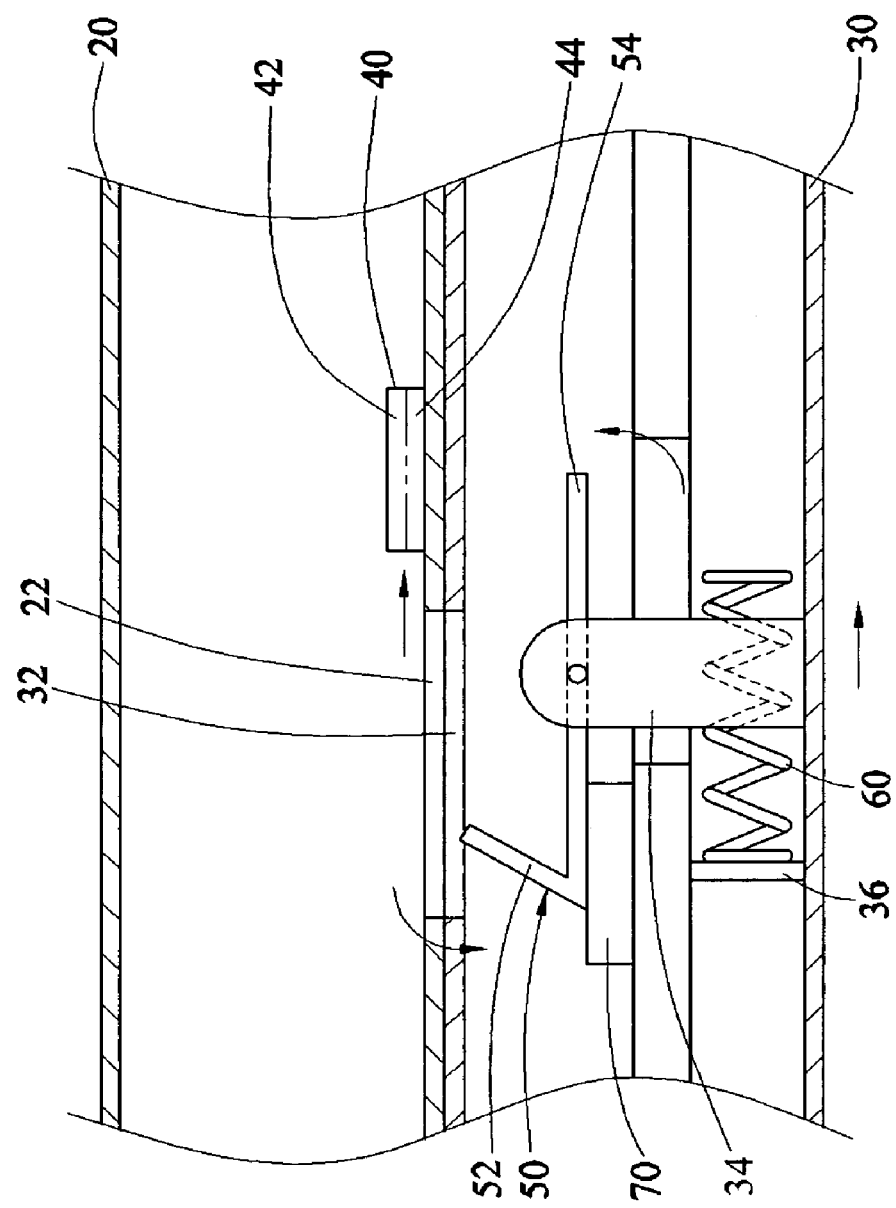
FIG. 4 is a functional view of a magnetic latch assembly after latching.

In FIGS. 2A, 3, and 4, the magnetic block 40 is movably disposed on inner side of the first body 20; therefore, the magnetic block 40 can be selectively moved close to or away from the first opening 22. Besides, the magnetic block 40 includes a first magnetic pole 42 formed at one side of the magnetic block 40 and located away from the first body 20, and a second magnetic pole 44 with an opposite polarity to the first magnetic pole 42 formed at the other side of the magnetic block 40 and located close to the first body 20. Moreover, the magnetic block 40 further includes an extension portion 46 formed on the magnetic block 40. The extension portion 46 is extended and passed through the sliding slot 24 and then is protruded from the first body 20, so that a user may push the extension portion 46 to drive the magnetic block 40 moving.

Figure 2B:
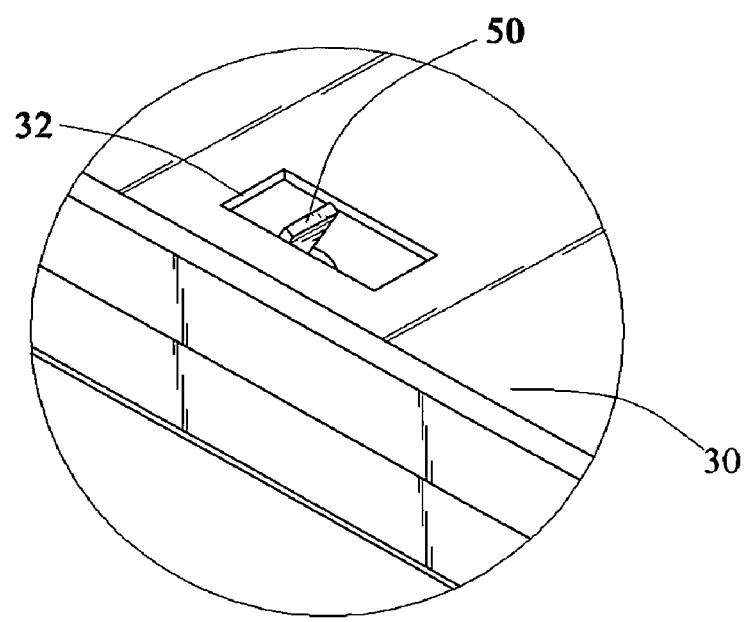
FIG. 2B is an enlarged view of a portion of the second body.

Referring to FIGS. 2B, 3, and 4, the second body 30 has a pivoted seat 34. A middle part of a magnetic latch 50 is pivotly mounted on the pivoted seat 34 so as to pivotly dispose the magnetic latch 50 on the second body 30 and let the magnetic latch 50 corresponding to the second opening 32. In addition, two ends of the magnetic latch 50 form a hook portion 52 and a tip portion 54, respectively. The polarity of the hook portion 52 is opposite to that the polarity of the tip portion 54 and the first magnetic pole 42, so that the hook portion 52 can be attracted by and stuck to the first magnetic pole 42. On the other hand, because the polarity of the tip portion 54 is opposite to that the polarity of the second magnetic pole 44, the tip portion 54 repels the second magnetic pole 44 due to magnetic force.

In order to avoid the problem that the hook portion 52 of the magnetic latch 50 without being pushed by an external force to be passed through the second opening 32 and then protruded from the second body 30, the magnetic latch assembly further includes a spring 60 disposed on the second body 30. One end of the spring 60 is against a baffle plate 36 of the second body 30. The other end of the spring 60 is against the tip portion 54 of the magnetic latch 50, so as to keep the hook portion 52 located within the second body 30.

As shown in FIG. 4, it is a functional view of a magnetic latch assembly after latching. When wants to fix the first body 20 on the second body 30, one can apply a force to the first body 20 to close up against the second body 30 and let the first opening 22 connect with the second opening 32. Then, one applies another force to push the extension portion 46, so as to push the magnetic block 40 to move toward the first opening 22. At this moment, the magnetic block 40 is located above the tip portion 54 and the second magnetic pole 44 is facing the tip portion 54. Because the polarity of the second magnetic pole 44 is exactly same as that of the tip portion 54, the second magnetic pole 44 of the magnetic block 40 repels the magnetic force generated by the tip portion 54, so that a torque is generated against the elastic force of the spring 60 to drive the magnetic latch 50 rotating and cause the spring 60 being compressed and forming an elastic force. At the same time, the magnetic latch 50 can bring the hook portion 52 passing the second opening 32 and the first opening 22, and then the hook portion 52 is against the magnetic block 40 which is located on the inner side of the first body 20. In addition, since the magnetic block 40 is against the first magnetic pole 42 of the magnetic block 40 and the polarity of the first magnetic pole 42 is opposite to that the polarity of the hook portion 52, the hook portion 52 can be firmly attached by the magnetic block 40.

FIG. 4 also discloses the condition that the magnetic latch 50 is retracted from the first body 20 to the second body 30. When one wants to unlatch the magnetic latch assembly to separate the first body 20 and the second body 30, one can apply a force to the extension portion 46, so that the magnetic block 40 is forced to move far away from the first opening 22 and the hook portion 52 of the magnetic latch 50. Beside, the hook portion 52 is no more absorbed by the magnetic block 40. In the mean time, by the falling weight of the tip portion 54 itself and pushing the hook portion 52 by the spring 60, the magnetic latch 50 can be rotated to bring the tip portion 54 out of the first body 20 and back to the second body 30; therefore, the first body 20 can be moved far away from the second body 30.

Moreover, the present invention may further be integrated with an electrical device as a power switch. As shown in FIGS. 3 and 4, the magnetic latch assembly further includes a switch 70. The switch is disposed on the second body 30 corresponding to the tip portion 54 of the magnetic latch 50. When the magnetic latch 50 is pushed by the spring 60 and then located on the second body 30, the switch 70 is triggered by the tip portion 54, so as to power on the electrical device 10; therefore, during the first body 20 is lifted, the power of the electrical device 10 is on, so the user can reduce the time for waiting the boot operation. When the tip portion 54 of the magnetic latch 50 is entered into the first body and hooked against the first body 20, it can stop to trigger the switch 70 and turn off the power of the electrical device 10. Hence, the user may be directly close the first body 20 against the second body 30, so that the first body 20 is fixed on the second body 30 by the magnetic latch 50 and the power of the electrical device 10 is cut off.

The magnetic block 40 and the magnetic latch 50 of the present invention are accommodated insides of the first body 20 and the second body 30, respectively, when the first body 20 is far away from the second body 30; therefore, the magnetic block 40 and the magnetic latch 50 would not protrude partly out of the first body 20 and the second body 30, so as to reduce the problems coming from the protruded structure.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic latch assembly, comprising:
   a first body having a first opening;
   a magnetic block movably disposed on an inner side of the first body and selectively moved close to or far away the first opening;
   a second body being selectively close up against the first body or far away from the first body, wherein the second body has a second opening corresponding to the first opening; and
   a magnetic latch disposed on the second body and corresponding to the second opening, wherein two ends of the magnetic latch form a hook portion and a tip portion, respectively, when the first body is close up against the second body and the magnetic block is moved close to the first opening, the magnetic block and the tip portion repelling each other due to magnetic force so as to drive the magnetic latch rotating, so that the hook portion is moved and passed through the second opening and the first opening and hooked against the inner side of the first body.

2. The magnetic latch assembly as claimed in claim 1, wherein the hook portion is against a side of the magnetic block far away the first body.

3. The magnetic latch assembly as claimed in claim 2, wherein a side of the magnetic block far away the first body forms a first magnetic pole and the polarity of the hook portion is reversed with respect to the polarity of the first magnetic pole, so that the hook portion can be absorbed on the first magnetic pole.

4. The magnetic latch assembly as claimed in claim 2, wherein a side of the magnetic block close to the first body forms a second magnetic pole and the polarity of the tip portion is the same as the polarity of the second magnetic pole to generate a repelled magnetic force.

5. The magnetic latch assembly as claimed in claim 1, further comprising an extension portion formed on the magnetic block, wherein the first body has a sliding slot and the extension portion is passed through the sliding slot and then is protruded from the first body.

6. The magnetic latch assembly as claimed in claim 1, further comprising a spring disposed on the second body for pushing the tip portion so as to keep the hook portion located within the second body.

7. The magnetic latch assembly as claimed in claim 6, further comprising a switch disposed on the second body, wherein the switch is triggered by the hook portion when the tip portion of the magnetic latch is pushed and located within the second body.

8. The magnetic latch assembly as claimed in claim 1, wherein a side of the first body is pivotly connected to a side of the second body.

* * * * *